(12) United States Patent
Lee

(10) Patent No.: US 11,619,048 B1
(45) Date of Patent: Apr. 4, 2023

(54) NON-SLIP REINFORCING BAR COUPLER

(71) Applicant: N C COUPLER LLC, Irvine, CA (US)

(72) Inventor: Hyun Uk Lee, Busan (KR)

(73) Assignee: N C COUPLER LLC, Irvine, CA (US)

( * ) Notice: Subject to any disclaimer, the term of this patent is extended or adjusted under 35 U.S.C. 154(b) by 17 days.

(21) Appl. No.: 17/506,604

(22) Filed: Oct. 20, 2021

(51) Int. Cl.
*F16B 7/04* (2006.01)
*E04C 5/16* (2006.01)

(52) U.S. Cl.
CPC ............ *E04C 5/165* (2013.01); *F16B 7/0406* (2013.01)

(58) Field of Classification Search
CPC ...... E04C 5/165; F16B 7/0406; F16B 5/0275; F16B 7/182
See application file for complete search history.

(56) References Cited

U.S. PATENT DOCUMENTS

| | | | | |
|---|---|---|---|---|
| 9,840,844 B2 * | 12/2017 | Prowse | ................. | E04B 1/5837 |
| 11,028,588 B2 * | 6/2021 | Lee | ........................ | F16B 7/0406 |

FOREIGN PATENT DOCUMENTS

| | | | | | |
|---|---|---|---|---|---|
| WO | WO-2004092508 A1 | * | 10/2004 | ............ | E04C 5/165 |
| WO | WO-2007061240 A1 | * | 5/2007 | ............ | E04C 5/165 |
| WO | WO-2011030973 A1 | * | 3/2011 | ............ | E04C 5/165 |
| WO | WO-2012046931 A1 | * | 4/2012 | ............ | E04C 5/165 |
| WO | WO-2014123298 A1 | * | 8/2014 | ............ | E04C 5/165 |

* cited by examiner

*Primary Examiner* — Adriana Figueroa

(57) ABSTRACT

Disclosed herein is a non-slip reinforcing bar coupler including: a body which has a body part of a pipe shape, a protrusion part formed in the middle of the body part, a pair of first screw threads formed on the outer surface of the body part and at both sides of the protrusion part, a pair of insertion holes formed at both sides of the body part, and a stopper formed in the middle of the inside of the body part; and a cap which has a cap insertion hole formed at one side, a cap body formed on the inner surface of the other side and having a second screw thread screw-coupled with the first screw thread, and a second inner sloping side formed on the inner surface of the cap insertion hole.

3 Claims, 11 Drawing Sheets

NON-SLIP REINFORCING BAR COUPLER

BACKGROUND OF THE INVENTION

Field of the Invention

The present invention relates to a non-slip reinforcing bar coupler, and more particularly, to a non-slip reinforcing bar coupler which can keep coupling firm with no slip of reinforcing bars even though tensile force is applied, is easy to construct, and is excellent at adhesive strength to concrete when being embedded in concrete.

Background Art

In general, concrete is complex composition of cement, sand, gravels, and water being mixed together. Such concrete has compression strength which is relatively high, but has tensile strength which is still lower than compression strength, thus is easy to generate a crack.

In order to reinforce strength of concrete, reinforcing bars are arranged in a mold to which concrete will be poured and concrete is poured and cured in the mold so as to reinforce strength of concrete.

Such a conventional reinforced concrete structure promotes construction of various structures since having excellent compression strength and tensile strength, and has been used widely in construction of various buildings and civil engineering structures since having superior physical properties.

Steel bars used for reinforcement of concrete are reinforcing bars, such as rounded bars and deformed bars. The rounded bars do not have joints on the surface of each steel bar, and the deformed bars have joints and ribs on the surface thereof.

The deformed bars have advantages in that adhesive power to concrete which is stronger than the rounded bars, and in that a crack width gets smaller when a crack is formed in concrete. Therefore, people generally not use the rounded bars but the deformed bars as main reinforcing bars.

Arrangement of the reinforcing bars is carried out when buildings are constructed or concrete structures for various civil engineering works are manufactured. The reinforcing bars are manufactured in standardized length, and it is necessary to connect reinforcing bars of a predetermined length with one another during the arrangement of the reinforcing bars.

There are typically a lap joint method, a welded joint method, a screw joint method, and a connector joint method as methods for connecting reinforcing bars. The lap joint method is a method of winding wires on end portions of deformed bars, which are overlapped, to connect them, so that arrangement of the deformed bars can be carried out relatively easily. However, the lap joint method is complicated in work since the wires must be wound on every deformed bar, and has safety problems since flexural strength at the connected parts is weak.

Meanwhile, the welded joint method is a method of facing end portions of reinforcing bars and welding the end portions, so that the strength at the connected parts is good. However, the welded joint method is complicated in work and delays construction work since taking long time.

The screw joint method is a method of processing screws at end portions of deformed bars and connecting the end portions through screw-coupling, but needs additional equipment for processing the connected end portions.

In order to solve the above problems, Korean Patent No. 1030579 discloses a 'reinforcing bar coupler'. The reinforcing bar coupler is a hollow cylindrical tube, and includes: a coupler cap of which the both sides are formed to be symmetrical based on the longitudinal center so that a pair of reinforcing bars are respectively inserted into end portions of both sides thereof, and which has a screw thread; and a tightening spring to which the screw thread is coupled.

Such a reinforcing bar coupler has a disadvantage in that the reinforcing bar coupler is broken at a grasped part since parts getting in contact with the tightening spring receive intensive stress.

Moreover, Korean Patent No. 1003302 discloses a 'high-strength reinforcing bar coupler', and Korean Patent No. 0977658 discloses a 'rod coupling device'. Such couplers cause a slip phenomenon of reinforcing bars when tensile force is applied to the reinforcing bars.

SUMMARY OF THE INVENTION

Accordingly, the present invention has been made to solve the above-mentioned problems occurring in the prior arts, and it is an object of the present invention to provide a non-slip reinforcing bar coupler which can keep coupling firm with no slip of reinforcing bars even though tensile force is applied when being embedded in concrete.

It is another object of the present invention to provide a non-slip reinforcing bar coupler, which is easy to construct and promotes construction work.

To accomplish the above object, according to the present invention, there is provided a non-slip reinforcing bar coupler including: a body which has a body part of a pipe shape, a protrusion part formed in the middle of the body part, a pair of first screw threads formed on the outer surface of the body part and at both sides of the protrusion part, a pair of insertion holes formed at both sides of the body part, and a stopper formed in the middle of the inside of the body part; and a cap which has a cap insertion hole formed at one side, a cap body formed on the inner surface of the other side and having a second screw thread screw-coupled with the first screw thread, and a second inner sloping side formed on the inner surface of the cap insertion hole.

Additionally, the non-slip reinforcing bar coupler includes: a locker which has a plurality of compression pieces formed in an arc shape in section, spikes respectively protruding from the inner wall surfaces of the compression pieces, and a first outer sloping side formed on the outer surface of the front of each compression piece to have the same inclination angle as a second inner sloping side of the cap; a guide member which has a fixing ring located between the insertion hole of the body and the locker, and a plurality of guides which protrude from the fixing ring toward the inside of the locker in a predetermined length and are inserted into the inner wall surfaces of the compression pieces to guide the positions of the compression pieces; and a friction-preventing ring disposed between the fixing ring and the insertion hole to prevent generation of friction between the fixing ring and the body.

The non-slip reinforcing bar coupler according to an embodiment of the present invention allows a worker to easily insert reinforcing bars into the body since the guide member supports the inside of the locker. Moreover, the non-slip reinforcing bar coupler according to an embodiment of the present invention can screw-couple the cap smoothly by preventing generation of friction between the locker and the body when the cap is rotated since the friction-preventing ring is arranged between the guide member and the body, thereby preventing a damage between the locker and the body.

Furthermore, the insertion tube of the guide member is inserted into the insertion hole of the body and is locked in its position so as to improve tensioning force to the reinforcing bar and tightening power of the cap.

Additionally, the reinforcing bar coupler according to the present invention can firmly couple the reinforcing bar just by two steps of inserting the reinforcing bar into the temporarily assembled cap and tightening the cap to the body, the worker can perform construction work easily and rapidly.

In addition, because the outer diameter of the cap is larger than the outer diameter of the body, a gap is formed between a pair of the caps. Therefore, when the coupler is embedded in concrete, strength of cured reinforced concrete is increased due to excellent cementing power with the concrete.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, preferred embodiments of the present invention will now be described in detail with reference to the attached drawings, in which like reference numbers denote corresponding parts throughout the drawings.

It should be understood that the terms "comprising" and "including" in the discussion directed to the present invention and the claims are used in an open-ended fashion and thus should be interrupted to mean "including", but not limited thereto.

Figure 1:
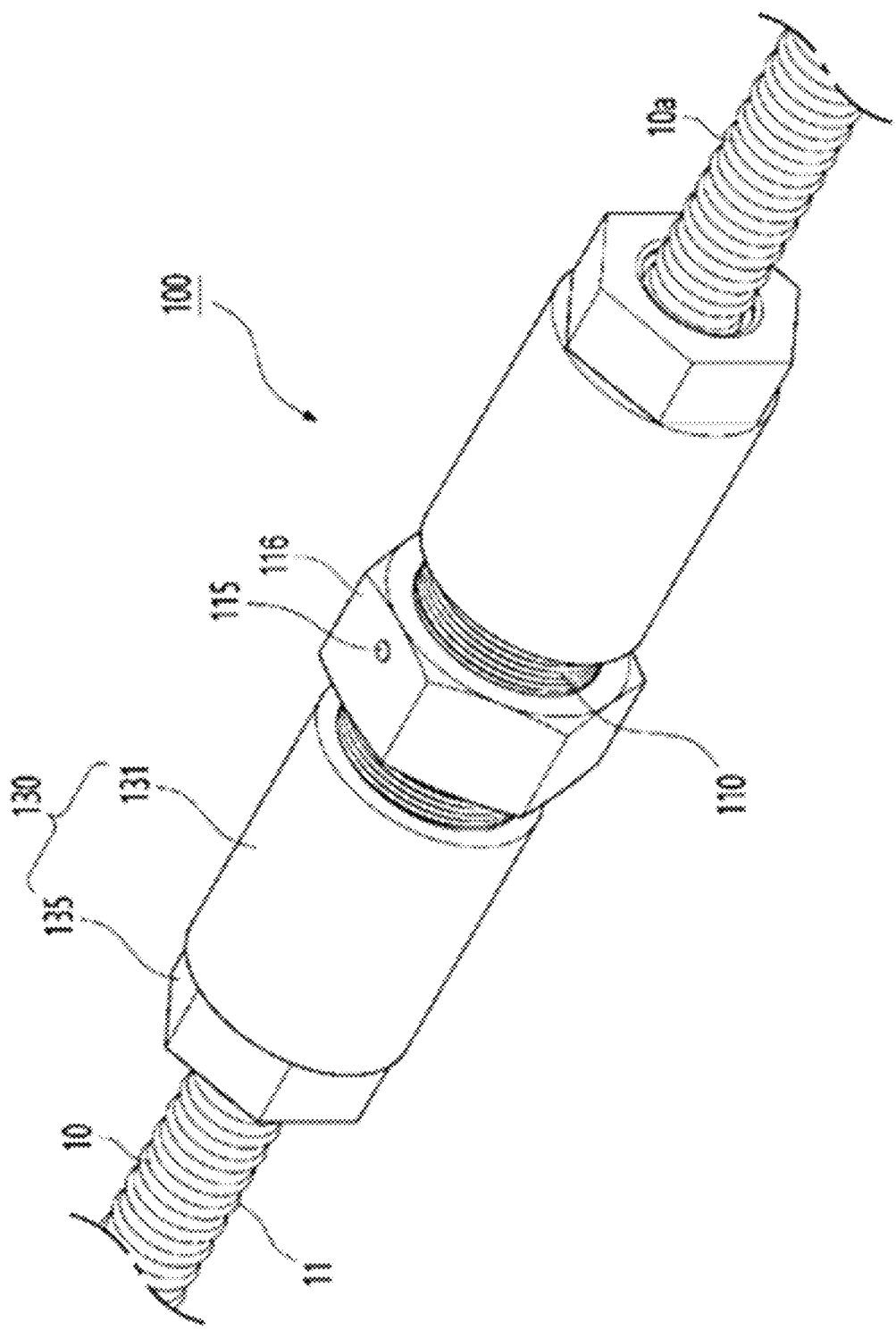
FIG. 1 is a perspective view of a reinforcing bar coupler according to a preferred embodiment of the present invention.
Figure 2:
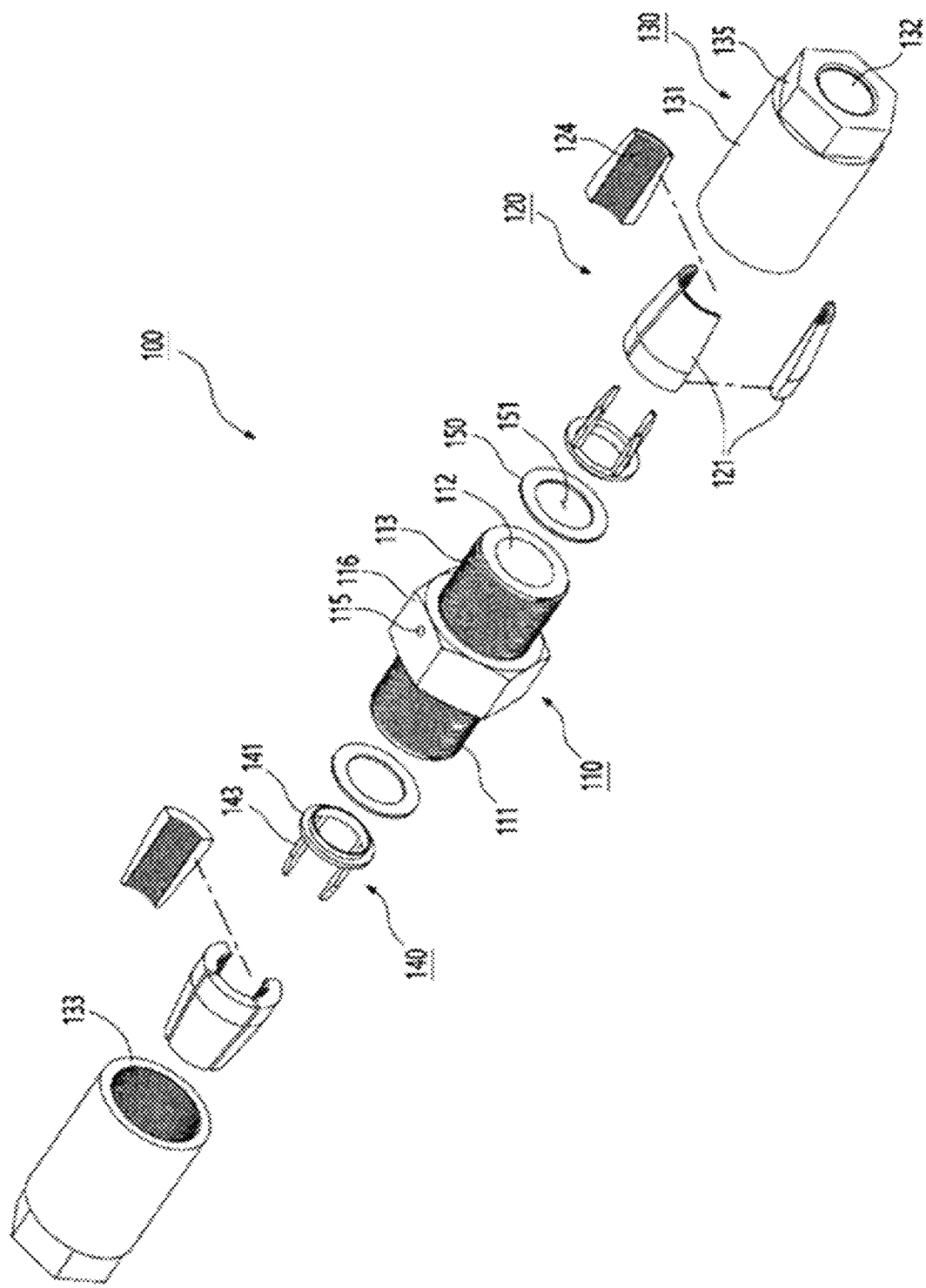
FIG. 2 is an exploded perspective view of the reinforcing bar coupler.

FIG. 1 is a perspective view illustrating a state where a pair of reinforcing bars 10 are coupled to a reinforcing bar coupler 100 according to a preferred embodiment of the present invention, and FIG. 2 is an exploded perspective view of the reinforcing bar coupler 100.

As illustrated in the drawings, the reinforcing bar coupler 100 according to the preferred embodiment of the present invention includes: a body 110; lockers 120 getting in contact with both sides of the body 110 in order to surround and fix the outer circumferential surfaces of the reinforcing bar 10; caps 130 each of which is screw-coupled with the body 110 and presses the front end of the locker 120 accommodated in the cap 130, so that the front end of the locker 120 is shrunken so as to prevent a pair of the reinforcing bars 10 from getting out of the locker 120; guide members 140 for respectively guiding positions of the lockers so that the reinforcing bars 10 can be easily inserted into the lockers 120; and friction-preventing rings 150 each of which is arranged between the locker 120 and the body 110 in order to prevent friction between the locker 120 and the body 110 when the cap 130 is rotated.

Figure 3:
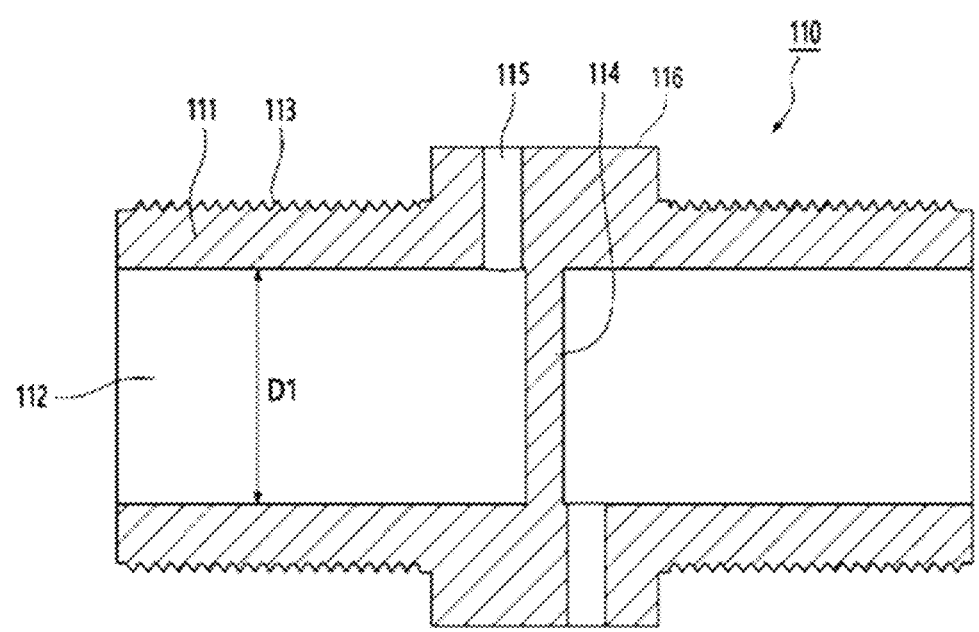
FIG. 3 is a cross sectional view of a body structure of the reinforcing bar coupler.

FIG. 3 is a cross sectional view illustrating the body 110 in section. As illustrated in FIGS. 2 and 3, the lockers 120 are arranged at both sides of the body 110 and the reinforcing bars 10 are inserted into the body 110. The body 110 is in a circular pipe form and includes a body part 111 and a protrusion part 116 formed at the center thereof. The body part 111 includes insertion holes 112 respectively formed at both sides thereof so that a pair of the reinforcing bars 10 are inserted into the insertion holes 112, and a stopper 114 formed in the middle of the inside of the body part 111.

A pair of first screw threads 113 at both sides of the protrusion part 116 are formed on the outer surface of the body part 111, and check holes 115 at both sides of the stopper 114 are formed up to the inside of the body part 111. It is preferable that the check hole 115 be formed in the opposite direction to each other at both sides of the stopper 114 as illustrated in FIG. 3 since rigidity of the body 110 gets weakened if the check holes 115 are formed in the same direction.

Preferably, the protrusion part 116 has a sectional shape to engage with a tool, for instance, a hexagonal shape.

Figure 4A:
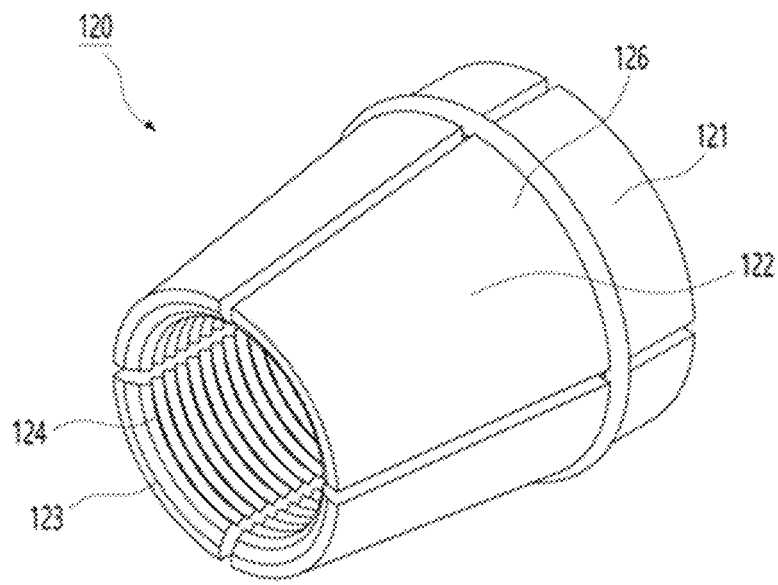
FIG. 4A is a perspective view of a locker structure of the reinforcing bar coupler.
Figure 4B:
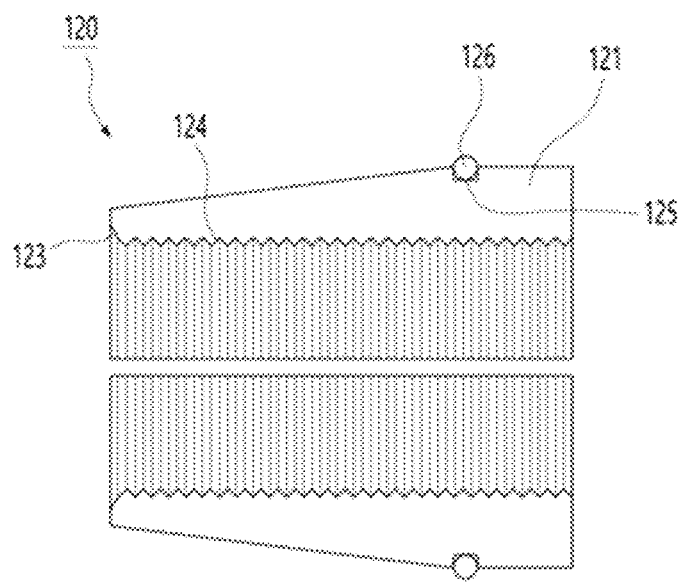
FIG. 4B is a cross sectional view of a locker structure of the reinforcing bar coupler

FIG. 4A is a perspective view illustrating a structure of the locker 120, and FIG. 4B is a cross sectional view illustrating the locker 120. As illustrated in FIGS. 2 and 4B, the locker 120 includes several compression pieces 121 formed in an arc shape in section as if the pipe is split into several parts in the axial direction. The locker 120 in the preferred embodiment of the present invention includes four compression pieces 121, but according to circumstances, the number of the compression pieces 121 may be more or less than four.

Each of the compression pieces 121 has a ring insertion groove 125 formed on the outer surface thereof in the circumferential direction, and a coupling ring 126 with elasticity is coupled to the ring insertion groove 125. The coupling ring 126 is fit into the ring insertion grooves 125 of the four compression pieces 121 so as to form the locker 120 of a pipe shape which is circular in section as illustrated in FIG. 4(a).

It is preferable that the inner diameter of the locker 120 of the pipe shape formed by a plurality of the compression pieces 121 be formed to correspond to the outer diameter of the reinforcing bar 10.

A first outer sloping side 122 is formed on the outer surface of the front of each compression piece 121, and a first inner sloping side 123 is formed on the inner surface of the front of each compression piece 121. The first inner sloping side 123 is larger in sloping angle than the first outer sloping side 122. The first outer sloping side 122 is pressed while touching a second inner sloping side 134 formed on the inner surface of the cap 130 when the cap 130 and the body 110 are screw-coupled with each other, so that a plurality of the compression pieces 121 are shrunken to fix the reinforcing bars 10 not to get out of the body 110.

As illustrated in FIG. 4B, the first inner sloping side 123 is inclined toward the outside in the radial direction and serves to guide the reinforcing bar 10 inwards when the reinforcing bar 10 is inserted between a plurality of the compression pieces 121 from the outside. That is, the reinforcing bar 10 is inserted into the body along the slope of the first inner sloping side 123.

A protrusion-type spike 124 is formed on the inner surface of each compression piece 121. The spike 124 is coupled and locked to a joint 11 of the reinforcing bar 10 inserted into the spike 124 so as to support the reinforcing bar 10 not to get out even though tensile force is applied to the reinforcing bar 10.

Figure 5:
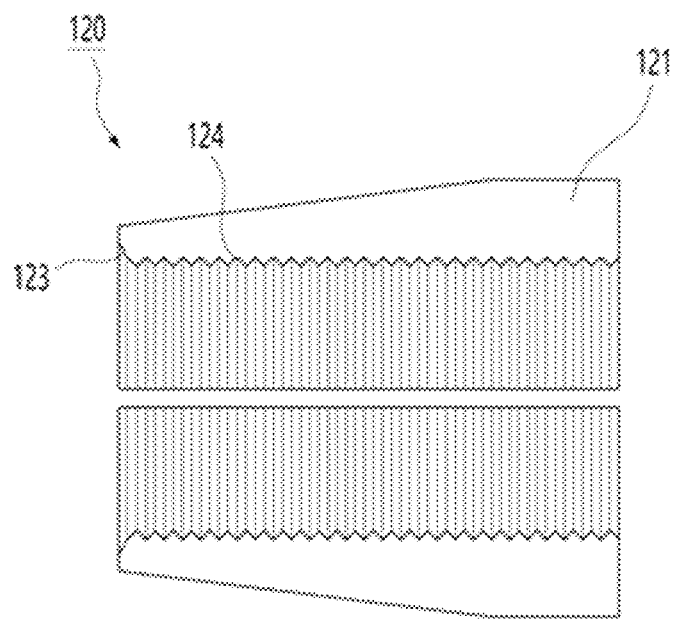
FIG. 5 is a sectional view illustrating a modification of a locker of the reinforcing bar coupler.

Meanwhile, FIG. 5 is a sectional view illustrating a modification of the locker 120. As illustrated in FIG. 5, as occasion demands, the locker 120 may do not have the ring insertion groove 125 formed on the surface thereof.

Figure 7:
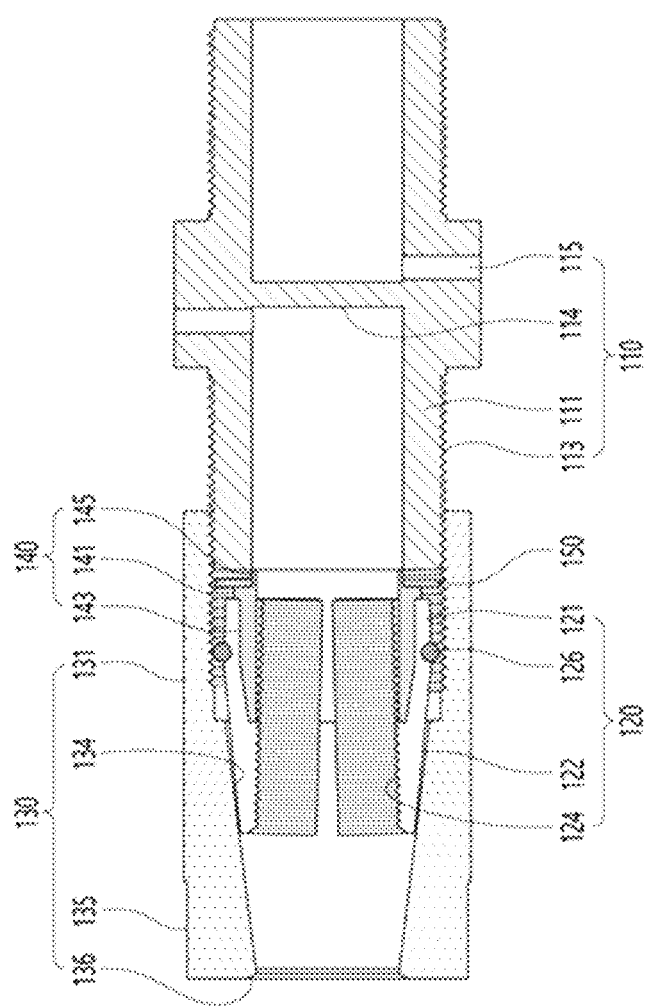
FIGS. 7 to 9B are views illustrating a process of connecting reinforcing bars using the reinforcing bar coupler according to the embodiment of the present invention.

The cap 130 is screw-coupled with the body 110. Then, a plurality of the compression pieces 121 of the locker 120 accommodated therein are pressed and shrunken inwards so as to prevent the reinforcing bar 10 accommodated in the locker 120 from getting out. As illustrated in FIGS. 2 and 7, the cap 130 has a cap body 131 of a pipe shape. The cap body 131 includes a second screw thread 133 formed on the inner surface of one side thereof to be screw-coupled with the first screw thread 113, a cap insertion hole 132 formed at the other side thereof so that the reinforcing bar 10 is inserted into the cap insertion hole 132, and a second inner sloping side 134 formed on the inner surface of the cap insertion hole 132.

The second inner sloping side 134 has the same inclination angle at the first outer sloping side 122 of the compression piece 121, so that the locker 120 is pressed while moving along the second inner sloping side 134 when the cap 130 is rotated by a tool.

The cap insertion hole 132 also has a second outer sloping side 136 formed on the inner surface of an end portion thereof to guide the reinforcing bar 10 into the cap insertion hole 132.

The cap 130 has a tool coupling part 135 formed on the outer surface of one side thereof. The tool coupling part 135 may have a predetermined sectional shape, for instance, a hexagonal shape, in order to couple the tool to rotate the cap 130.

The protrusion part 116 and the tool coupling part 135 have the same sectional shape, but preferably, a diameter of the protrusion part 116 is larger than a diameter of the tool coupling part 135. The reason is to easily rotate the tool coupling part 135 in a state where the protrusion part 116 is fixed in safety by the tool.

Figure 6A:
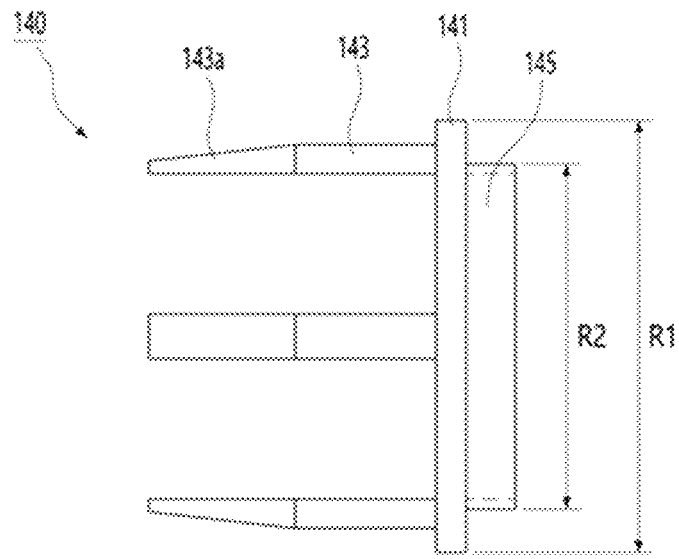
FIG. 6A is a side view of a guide structure of the reinforcing bar coupler.
Figure 6B:
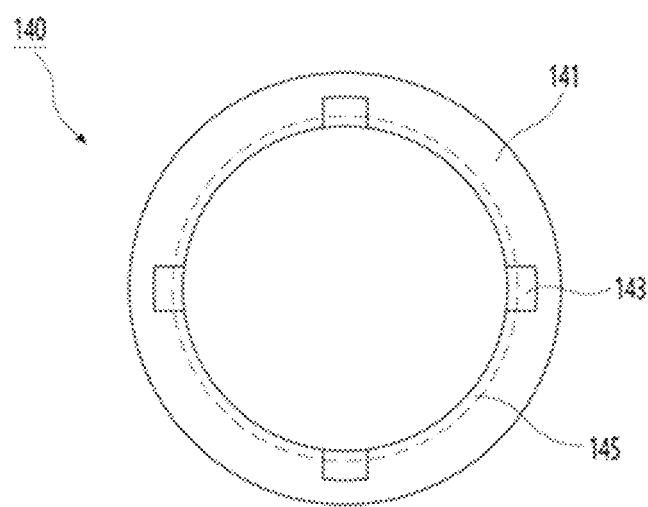
FIG. 6B is a top view of a guide structure of the reinforcing bar coupler

FIG. 6A is a side view illustrating a side structure of the guide member 140, and FIG. 6B is a top view illustrating the guide member 140 in front section.

As illustrated in FIGS. 2 and 6B, the guide member 140 is inserted into the locker 120 to hold the position of the locker 120 and to guide the reinforcing bar 10 to be easily inserted into the locker 120.

The guide member 140 includes: a fixing ring 141 arranged at the insertion hole 112 of the body 110; a plurality of guides 143 protruding along the outer circumference of the fixing ring 141 at intervals of a fixed angle toward the locker 120; and an insertion tube 145 protruding from the fixing ring 141 to the insertion hole 112 of the body 110 and inserted into the insertion hole 112.

Because the locker 120 is in the state where only the rear ends of the compression pieces 121 are coupled to the locker 120 by the coupling ring 126, the pipe shape illustrated in FIG. 4A is not maintained, and the compression pieces 121 are shrunken inwards in the radial direction or are irregularly dislocated. If the compression pieces 121 are dislocated, the pipe shape for inserting the reinforcing bar 10 thereinto cannot be formed. So, the guide member 140 is inserted into the locker 120 to fix the positions of the compression pieces 121, then, the front end can keep the pipe shape which is open so that the reinforcing bar 10 can be inserted.

Figure 9A:
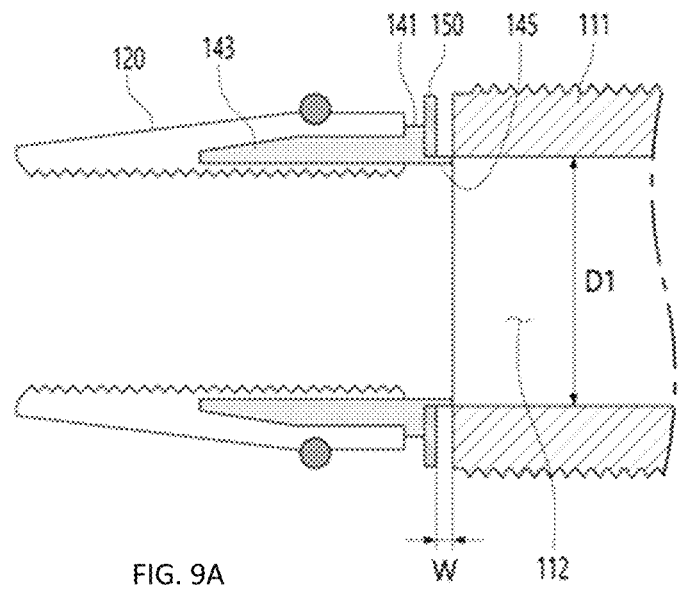

As illustrated in FIG. 9A, the fixing ring 141 has an outer diameter R1 larger than an inner diameter D1 of the insertion hole 112 of the body part 111, and the insertion tube 145 has an outer diameter R2 corresponding to the insertion hole 112. Inner diameters of the fixing ring 141 and the insertion tube 145 are smaller than the inner diameter D1 of the insertion hole 112.

The number of a plurality of the guides 143 corresponds to the number of a plurality of the compression pieces 121, or is more than that of the compression pieces 121. Each of the guides 143 has the length to be inserted to a predetermined length toward the first outer sloping side 122 of the compression piece 121. In this instance, each of the guides 143 has an outer sloping side 143a formed at the upper end thereof so as to be easily inserted into the compression piece 121.

As illustrated in FIG. 7, the guides 143 are respectively arranged inside the compression pieces 121 in a state where the cap 130 and the body 110 are assembled previously before the reinforcing bar 10 is inserted, so as to fix the positions of the compression pieces 121 to be opened. Then, the reinforcing bar 10 can be easily inserted into the locker 120.

Figure 8:
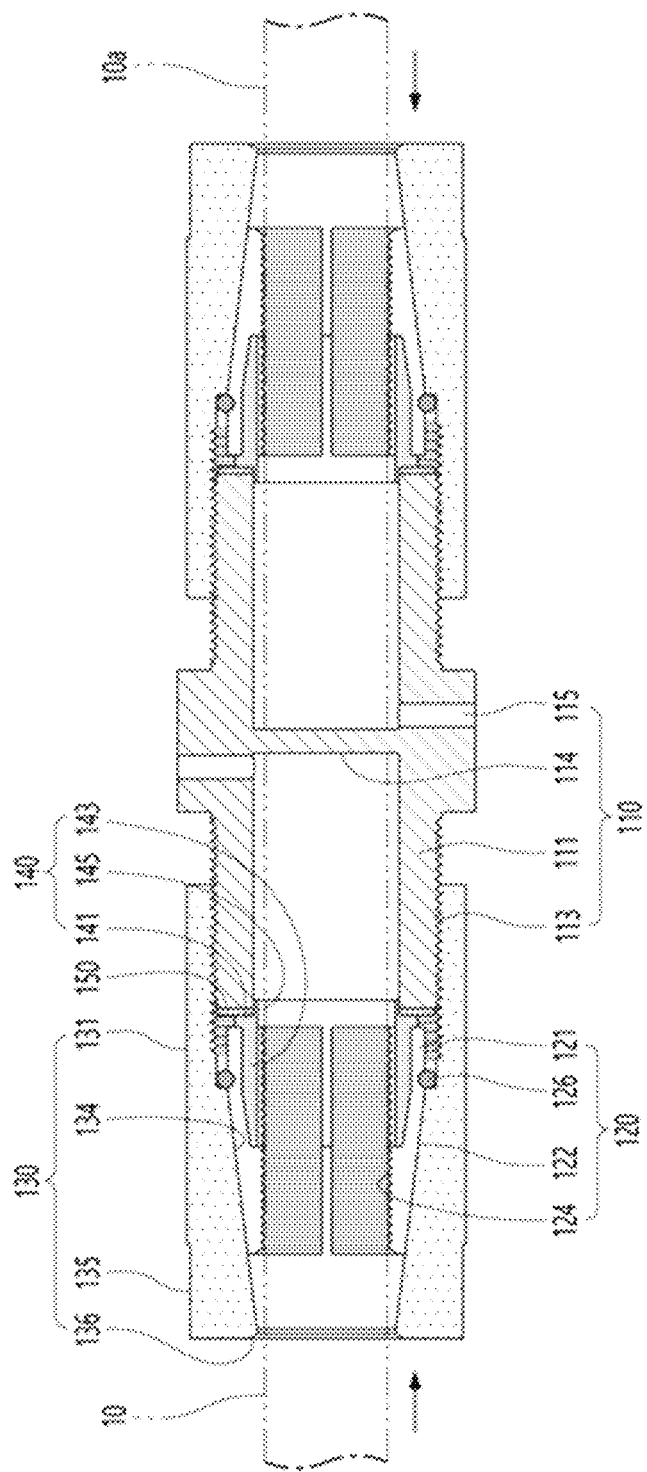

As illustrated in FIG. 8, the cap 130 and the body 110 are screw-coupled with each other. When the first outer sloping side 122 of each compression piece 121 is pressed along the second inner sloping side 134 of the cap 130 and is inserted into the cap 130, the guides 143 also press the reinforcing bar 10 together with the compression pieces 121 so as to fix the reinforcing bar 10 not to get out.

The insertion tube 145 protrudes downwards from the fixing ring 141 to a predetermined length. When the cap 130 and the body 110 are screw-coupled with each other, the cap 130 is forcibly fit into the insertion tube 112 of the body part 111. That is, as illustrated in FIG. 9A, the insertion tube 145 is located at an entrance of the insertion hole 112 in a state where the cap 130 and the body 110 are assembled temporarily.

Figure 9B:
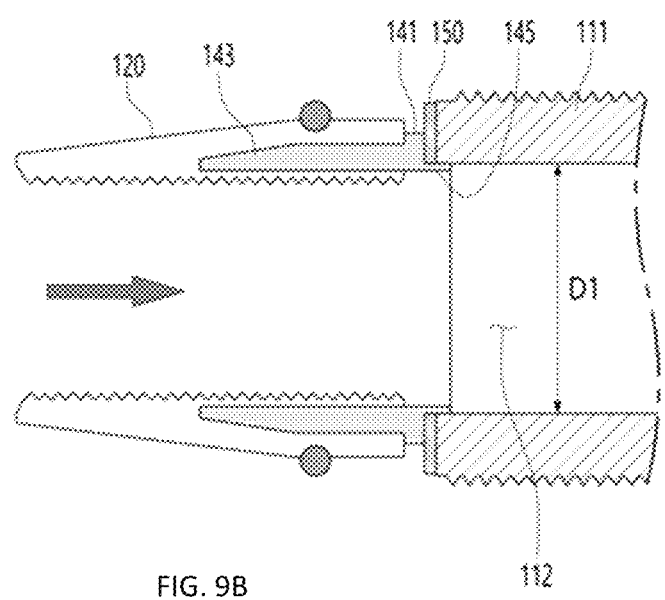

When the cap 130 is rotated by the tool and is completely screw-coupled with the body 110, as illustrated in FIG. 9B, the insertion tube 145 is pressed and forcibly fit into the insertion hole 112, so that the guide member 140 is fixed to the body 110. Then, the positions of the body 110, the guide member 140, the friction-preventing rings 150, and the locker 120 are all restricted to press and support the reinforcing bar 10, so that tensioning force to the reinforcing bar 10 is increased.

Especially, in the process of tightening the cap 130 by the tool, as illustrated in FIG. 9A, the fixing ring 141 is spaced apart from the insertion hole 112 at a predetermined interval (W), and the insertion tube 145 is pressed and inserted into the insertion hole 112 as illustrated in FIG. 9B, so that the fixing ring 141 moves further toward the insertion hole 112.

Since the locker 120 moves toward the body 110 as far as the predetermined interval (W), tensioning force to the reinforcing bar 10 is increased more, and the body 110, the locker 120, and the guide member 140 get in face contact with one another to increase clamping force of the cap 130.

Here, the friction-preventing rings 150 is arranged between the fixing ring 141 of the guide member 140 and the body 110. When the cap 130 is screw-coupled with the friction-preventing rings 150 while being rotated by the tool, friction is not generated between the locker 120 and the body 110 or between the fixing ring 141 and the body 110.

When the cap 130 is rotated by the tool, the fixing ring 141 of the guide member 140, which gets in contact with the insertion hole 112 of the body 111, and the body part 111 rub each other, thus interrupting smooth rotation of the cap 130. Furthermore, the generated friction force may damage the surface of the body part 111 getting in contact with the fixing ring 141.

The friction-preventing rings 150 is arranged between the fixing ring 141 and the insertion hole 112 of the body part 111 in order to prevent generation of friction when the cap 130 is rotated, thereby rotating the cap 130 smoothly. A tube insertion hole 151 is formed in the friction-preventing rings 150, and the insertion tube 145 of the guide member 140 is inserted through the tube insertion hole 151, and is inserted into the insertion hole 112.

Now, referring to FIGS. 1 to 9B, a usage process of reinforcing bars 100 according to the present invention will be described.

First, in order to connect the reinforcing bars 10, the body 110, the locker 120, and the cap 130 are coupled together in a temporarily assembled state so as to prepare the coupler 100.

A pair of the friction-preventing rings 150 are arranged at the insertion holes 112 of both sides of the body 110. Additionally, the guide members 140 are arranged at the tube insertion holes 151 of the friction-preventing rings 150 so that the insertion tubes 145 are fit into the tube insertion holes 151 of the friction-preventing rings 150.

A plurality of the compression pieces 121 are assembled to the lockers 120 of the pipe shape by the coupling rings 126 as illustrated in FIG. 4A. A plurality of the guides 143 are arranged on the inner wall surfaces of the compression pieces 121 to support the compression pieces 121 to keep the opened state.

The locker, 120, the guide member 140, and the friction-preventing ring 150 which are assembled, as illustrated in FIG. 7, are arranged at the insertion hole 112 of the body part 111, and the cap 130 is slightly screw-coupled with the body 110 so as to be in a temporarily coupled state. The same cap 130 is temporarily coupled to the opposed side of the body 110.

In the temporarily coupled state, the compression pieces 121 of the locker 120 are supported by the guides 143 to be opened at the front.

In this instance, when the is inserted into the cap insertion hole 132 of the cap 130, the penetrates through the inside of the locker 120 inside the cap 130 and is inserted into the insertion hole 112 of the body 110. When the reinforcing bar 10 is caught to the stopper 114 of the body 110, insertion of the reinforcing bar 10 stops.

When the reinforcing bar 10 is inserted into the coupler 100, the reinforcing bar 10 is smoothly inserted into the body 110 through the second outer sloping side 136 formed on the outer surface of the cap insertion hole 132 of the cap 130 and the first inner sloping side 123 of the locker 120.

In this instance, a worker can confirm with naked eyes whether the reinforcing bar 10 is perfectly inserted, through the check holes 115 of the body 110.

After the worker confirms whether the reinforcing bar 10 is perfectly inserted through the check holes 115, as illustrated in FIG. 8, the worker rotates the cap 130 in order to tighten the cap 130 in the direction of the body 110.

When the worker couples a tool, such as a wrench or a hydraulic tool, to the tool coupling part 135 formed on the outer surface of the cap 130 to tighten the cap 130, the cap 130 screw-coupled with the body 110 moves in the direction of the body 110.

Because the second inner sloping side 134 is formed on the inner surface of the cap 130 and the first outer sloping side 122 is formed on the outer surface of the locker 120 inserted into the cap 130, when the cap 130 moves in the direction of the body 110, the opened front part of the locker 120 is shrunken while the first outer sloping side 122 of the locker 120 gets in contact with the second inner sloping side 134 of the cap 130, and the compression pieces 121 of the locker 120 get in contact with the outer surface of the reinforcing bar 10.

In this instance, the guides 143 are transformed while being shrunken together with the front part of the locker 120 till the front part of the locker 120 is shrunken.

When the worker tightens the cap 130 more, the first outer sloping side 122 of the locker 120 moves along the second inner sloping side 134 of the cap 130. Then, the spikes 124 protruding from the inner surfaces of the compression pieces 121 of the locker 120 penetrate into the outer surface, namely, joints and ribs, of the reinforcing bar 10, so that the reinforcing bar 10 is coupled and fixed to the coupler 100.

Here, when the worker continues tightening of the cap 130 using the tool, as illustrated in FIG. 9B, the insertion tube 145 is forcibly fit into the insertion hole 112, and the friction-preventing ring 150 gets in contact with the surface of the entrance of the body part 111. Therefore, when the cap 130 is rotated to be tightened, the friction-preventing ring 150 is located between the fixing ring 141 and the body part 111 so as to prevent generation of friction on the fixing ring 141 and the body part 111.

Moreover, when screw-coupling between the cap 130 and the body 110 is completed and the reinforcing bar 10 is coupled completely, the guide member 140, the locker 120, the friction-preventing ring 150, and the body 110 are coupled with one another to be restricted physically. So, tensioning force to the reinforcing bar 10 is increased, and fixing power to the reinforcing bar 10 is also increased.

As described above, the reinforcing bar coupler according to the present invention allows the worker to easily insert the reinforcing bar into the body since the guide member supports the inside of the locker. Additionally, the friction-preventing ring is arranged between the guide member and the body in order to prevent generation of friction between the locker and the body when the cap is rotated, so that the cap can be screw-coupled smoothly so as to prevent a damage between the locker and the body.

Moreover, the insertion tube of the guide member is inserted into the insertion hole of the body and is locked in its position so as to improve tensioning force to the reinforcing bar and tightening power of the cap.

Furthermore, the reinforcing bar coupler according to the present invention can firmly couple the reinforcing bar just by two steps of inserting the reinforcing bar into the temporarily assembled cap and tightening the cap to the body, the worker can perform construction work easily and rapidly.

Additionally, because the outer diameter of the cap is larger than the outer diameter of the body, a gap is formed between a pair of the caps. Therefore, when the coupler is embedded in concrete, strength of cured reinforced concrete is increased due to excellent cementing power with the concrete.

Figure 10A:
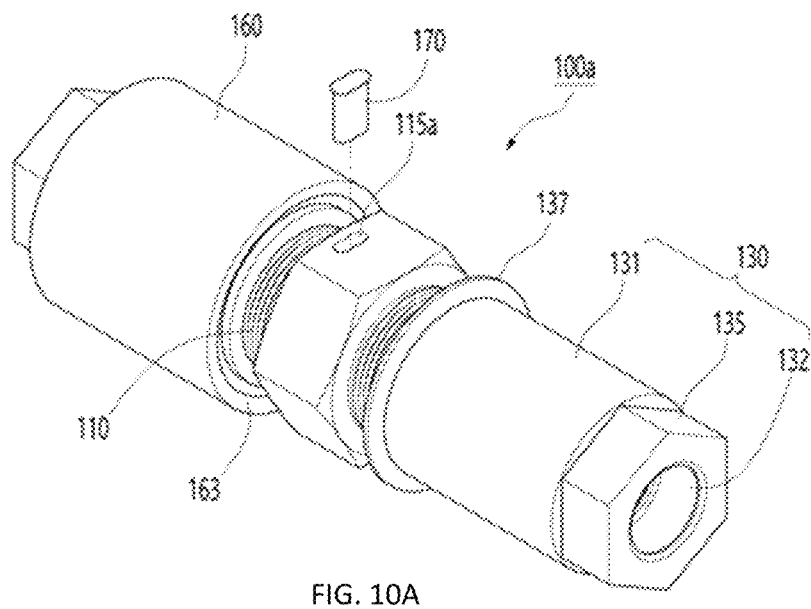
FIGS. 10A and 10B are perspective views illustrating a reinforcing bar coupler according to another preferred embodiment of the present invention
Figure 10B:
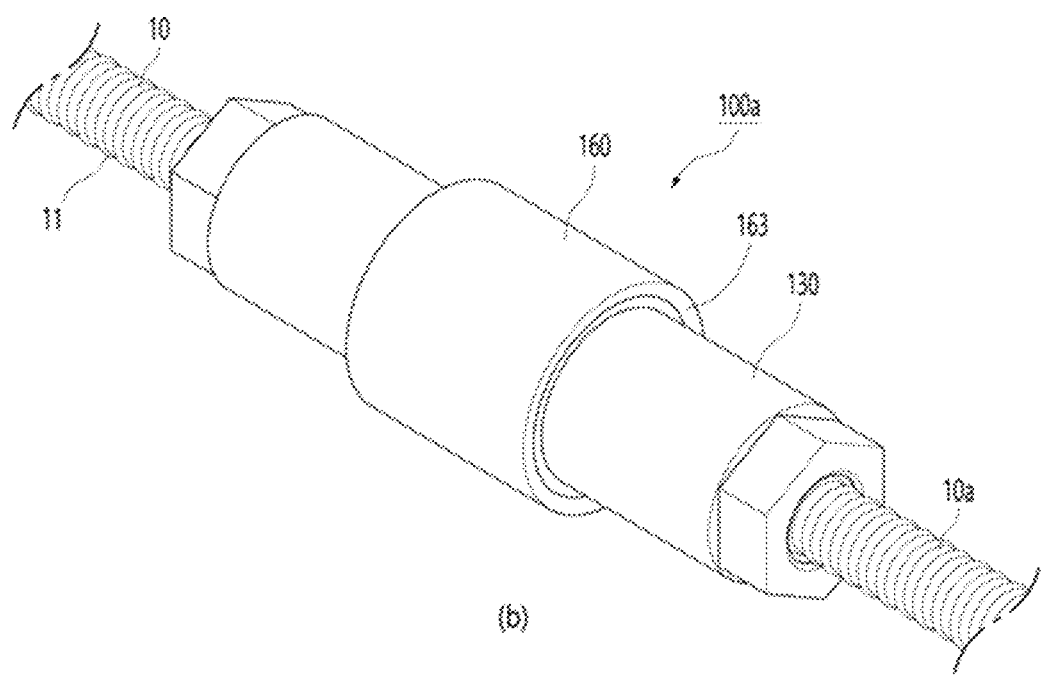

FIGS. 10A and 10B show perspective views illustrating a reinforcing bar coupler 100a according to another preferred embodiment of the present invention, and FIGA. 11A and 11B show cross sectional views illustrating a state where a reinforcing bar 10 is coupled to the reinforcing bar coupler 100a.

The reinforcing bar coupler 100a includes a check hole 115a formed in the surface of the body 110 to confirm whether the reinforcing bar 10 is completely inserted into the coupler, and a reinforcing bar fixing key 170 which is disposed to provide resistance to prevent slip of the reinforcing bar 10.

The check hole 115a is formed in a long hole shape with a predetermined length in the circumferential direction, and the reinforcing bar fixing key 170 is forcibly fit into the check hole 115a in the circumferential direction of the body 110 to have a predetermined width. The reinforcing bar fixing key 170 has the length to be supported by getting in contact with the joint 11 formed on the reinforcing bar 10 after penetrating through the body 110.

Figure 11A:
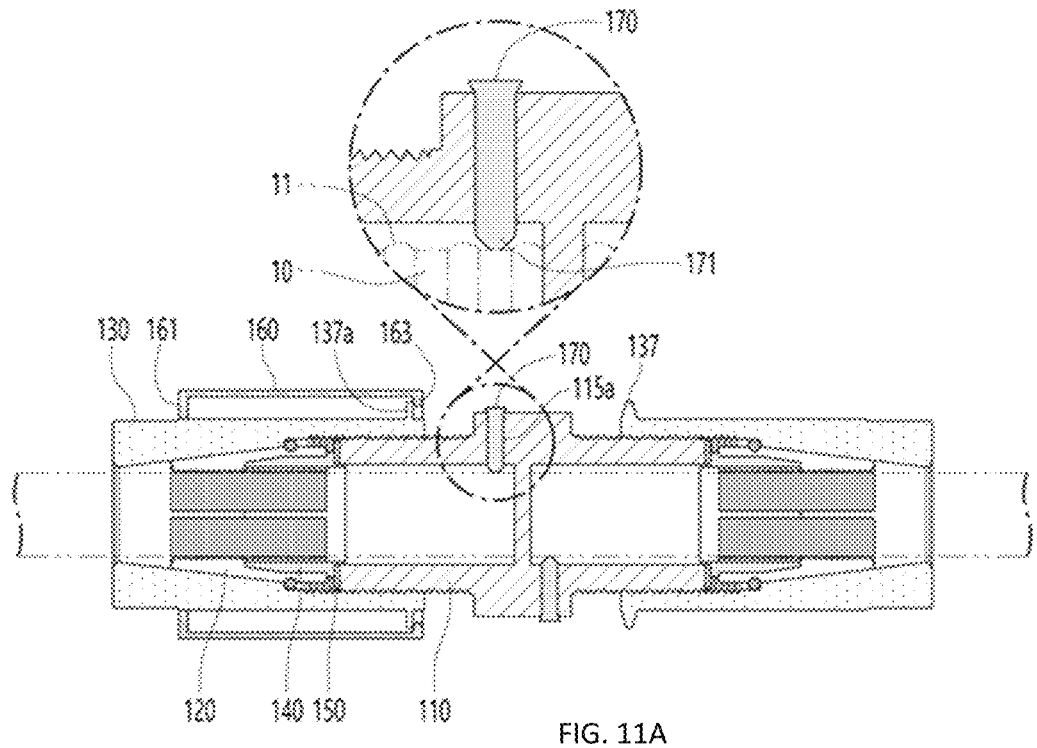
FIGS. 11A and 11B are cross sectional views illustrating a reinforcing bar coupler according to another preferred embodiment of the present invention.

As illustrated in the enlarged view of FIG. 11A, the reinforcing bar fixing key 170 includes a key end portion 171 formed at the lower portion thereof. The key end portion 171 is inserted into the body 111 after penetrating through the body 110, and then, is supported by getting in contact with the outer circumferential surface of the reinforcing bar 10 supported by the stopper 114. In this instance, the reinforcing bar fixing key 170 is inserted into the gap between the joints 11 formed on the surface of the reinforcing bar 10.

Because the reinforcing bar fixing key 170 is inserted between the joints 11 of the reinforcing bar 10, when the reinforcing bar 10 slips by tensile force, the reinforcing bar fixing key 170 forms resistance by being caught to the joint 11 so that the reinforcing bar 10 does not slip. So, the reinforcing bar fixing key 170 can reduce a slip generation rate of the reinforcing bar 10.

As occasion demands, the lower end portion of the reinforcing bar fixing key 170 is formed sharp to be inserted into a predetermined depth from the surface of the reinforcing bar 10.

Meanwhile, the reinforcing bar coupler 100a according to the second preferred embodiment of the present invention includes a coupling cover 160 for coupling a pair of caps 130 which will be coupled to the body 110. As illustrated in FIG. 11A, the coupling cover 160 opens the check hole 115 while the reinforcing bar is inserted so that the worker can confirm with the naked eyes whether the reinforcing bar 10 is inserted. Additionally, when the reinforcing bar 10 is inserted and the reinforcing bar fixing key 170 is forcibly fit, the coupling cover slides as illustrated in FIGS. 10B and 11B to hide the check hole 115.

A retaining protrusion 137 and a first fixing protrusion 137a are respectively formed on a pair of caps 130 which are coupled to the body 110. A second fixing protrusion 161 and a coupling protrusion 163 are formed at both sides of the coupling cover 160. The first fixing protrusion 137a and the second fixing protrusion 161 are formed vertically to engage with each other. The retaining protrusion 137 and the coupling protrusion 163 respectively have inclined end portions to be elastically retained or released.

Figure 11B:
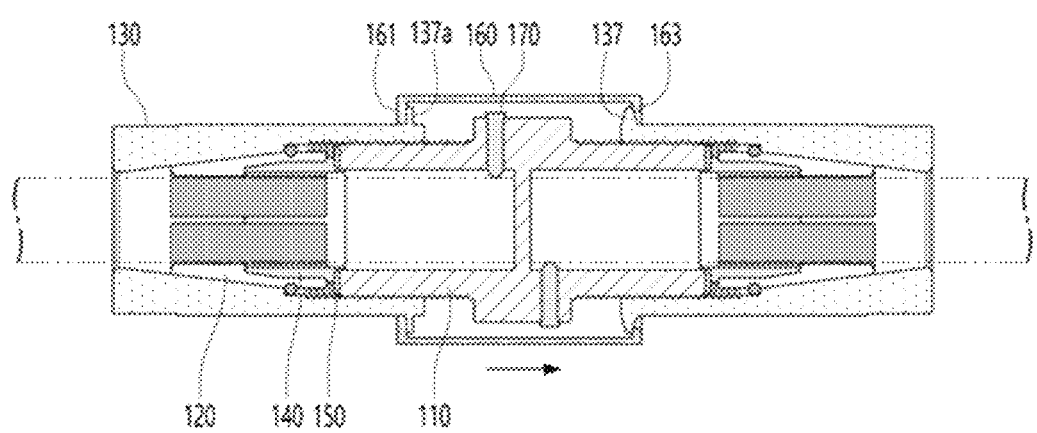

As illustrated in FIG. 11A, in the coupling process of the reinforcing bar 10, the coupling cover 160 slides toward the cap 130 on which the first fixing protrusion 137a is formed, when coupling of the reinforcing bar 10 and insertion of the reinforcing bar fixing key 170 are completed, as illustrated in FIG. 11B, the coupling cover 160 slides so that the coupling protrusion 163 is retained and coupled to the retaining protrusion 137.

So, the outside of the reinforcing bar fixing key 170 is hidden, and a pair of the caps 130 are restricted in their positions by the coupling cover 160. Since the positions of the caps 130 are restricted, binding forces to the locker 120 and the reinforcing bar 10 accommodated in the caps 130 can be improved more.

The technical thoughts of the present invention have been described hereinafter.

It is to be appreciated that those skilled in the art can change or modify the embodiments from the above description in various ways. Although it is not clearly illustrated or described herein, it is to be appreciated that those skilled in the art can change or modify the embodiments from the above description in various ways without departing from the scope and spirit of the present invention and such changes and modifications belong to the scope of the present invention. While the present invention has been described with reference to the particular illustrative embodiments, it is not to be restricted by the embodiments but only by the appended claims.

What is claimed is:

1. A non-slip reinforcing bar coupler comprising:
a body which has a body part of a pipe shape, a protrusion part formed in the middle of the body part, a pair of first screw threads formed on the outer surface of the body part and at both sides of the protrusion part, a pair of insertion holes formed at both sides of the body part, and a stopper formed in the middle of the inside of the body part;
a cap which has a cap insertion hole formed at one side, a cap body formed on the inner surface of the other side and having a second screw thread screw-coupled with one of the first screw threads, and a second inner sloping side formed on the inner surface of the cap insertion hole;
a locker which has a plurality of compression pieces formed in an arc shape in section, spikes respectively protruding from the inner wall surfaces of the compression pieces, and a first outer sloping side formed on the outer surface of a front of each compression piece to have the same inclination angle as a second inner sloping side of the cap;
a guide member which has a fixing ring located between the insertion hole of the body and the locker, and a plurality of guides which protrude from the fixing ring toward the inside of the locker in a predetermined length and are inserted into the inner wall surfaces of the compression pieces to guide the positions of the compression pieces;
a friction-preventing ring disposed between the fixing ring and the insertion hole to prevent generation of friction between the fixing ring and the body; and
an insertion tube extending from the lower portion of the fixing ring to a predetermined length so as to have an outer diameter corresponding to an inner diameter of the insertion hole of the body part, wherein the friction-preventing ring includes a tube insertion hole formed therein so that the insertion tube is inserted into the tube insertion hole, and wherein the insertion tube is held in the insertion hole and the friction-preventing ring is spaced apart from the insertion hole at a predetermined interval when the cap is not tightened, but when the cap is tightened, the insertion tube is pressed and is inserted into the insertion hole.

2. The non-slip reinforcing bar coupler according to claim 1, further comprising:

a check hole which is formed long in the circumferential direction of the body part; and a reinforcing bar fixing key which is inserted into the body part through the check hole to be arranged between joints of the reinforcing bar and gets in contact with the joints when the reinforcing bar slips to form resistance.

3. The non-slip reinforcing bar coupler according to claim 2, further comprising:

coupling covers which are coupled with a pair of the caps coupled to the body to be slidable and surround a boundary area of the caps to hide the check hole when the reinforcing bar fixing key is joined to the check hole.

* * * * *